United States Patent [19]

Boschen, Jr.

[11] E Re. 29,373

[45] Reissued Aug. 30, 1977

[54] METHOD AND APPARATUS FOR MOORING FLOATING VESSELS

[75] Inventor: Henry C. Boschen, Jr., Chippewa Falls, Wis.

[73] Assignee: Global Marine, Inc., Los Angeles, Calif.

[21] Appl. No.: 695,842

[22] Filed: June 14, 1976

Related U.S. Patent Documents

Reissue of:

[64] Patent No.: 3,822,663
Issued: July 9, 1974
Appl. No.: 296,079
Filed: Oct. 10, 1972

[51] Int. Cl.[2] ..... B63B 21/50

[52] U.S. Cl. ..... 114/293; 9/8 P; 114/264; 114/230

[58] Field of Search ..... 114/206 R, 230, 231, 114/144 R, 144 B, .5 R, .5 F, .5 D, 264, 265, 266, 293; 9/8 P; 61/94, 98

[56] References Cited

U.S. PATENT DOCUMENTS

| | | | |
|---|---|---|---|
| 2,771,617 | 11/1956 | Brackx | 9/8 P |
| 3,191,201 | 6/1965 | Richardson et al. | 114/.5 D |
| 3,461,828 | 8/1969 | Bielstein | 114/230 |
| 3,538,880 | 11/1970 | Smulders | 9/8 P |

*Primary Examiner*—Trygve M. Blix
*Assistant Examiner*—Charles E. Frankfort
*Attorney, Agent, or Firm*—Christie, Parker & Hale

[57] ABSTRACT

A method and apparatus for mooring floating vessels (e.g. ships) generally over a fixed location on the water bottom. The vessels are provided with guide means (e.g. a track) which encircle the hull of the vessel along a line which is spaced at or above the Plimsoll line and at or below the top edge of the hull. A plurality of movable carriages are carried by the guide means for separately attaching a plurality of anchor lines to the hull and for controlling the length thereof. Means are provided for selectively positioning the carriages at desired points along the track.

8 Claims, 5 Drawing Figures

1
2
3
4
5
6
7
8
9
10
11
12
13

1
2
5
7
8
9
10
11
15
16
17
18
19
34
A
B
C
D

Fig. 3
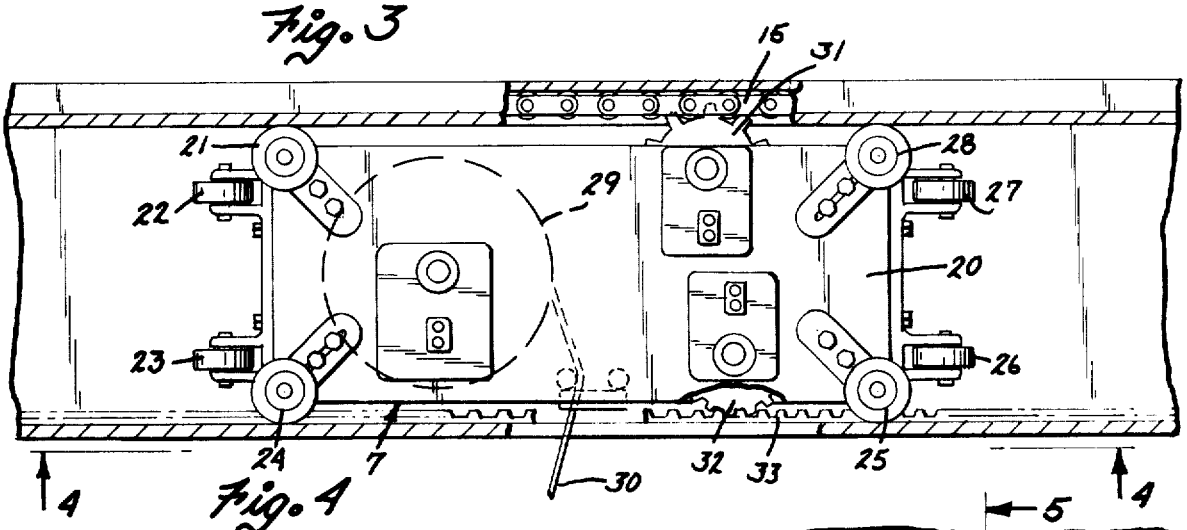
Fig. 4
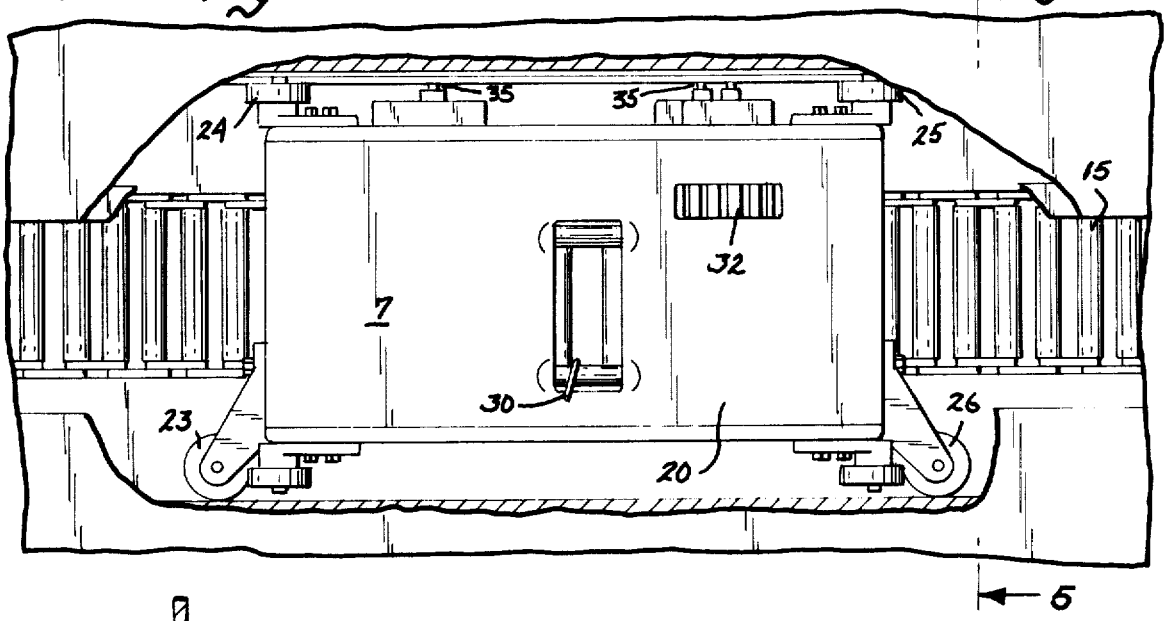
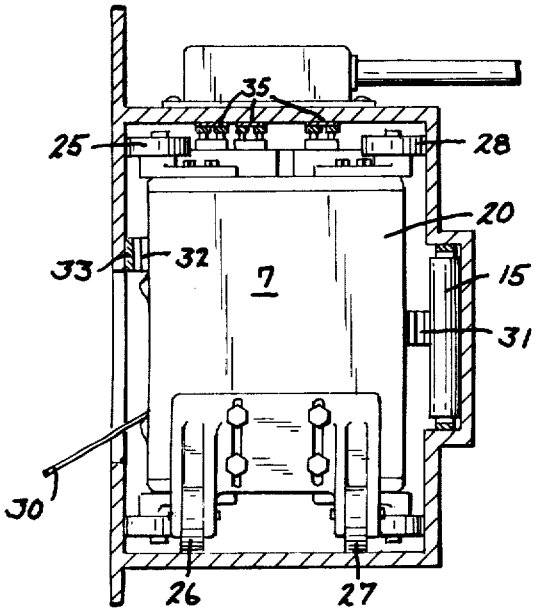
Fig. 5

METHOD AND APPARATUS FOR MOORING FLOATING VESSELS

Matter enclosed in heavy brackets [ ] appears in the original patent but forms no part of this reissue specification; matter printed in italics indicates the additions made by reissue.

BACKGROUND OF THE INVENTION

Often it is desired to moor a ship *or other buoyant floating structure* generally over a fixed location on the water bottom. This is particularly true in off-shore well drilling operations and is especially difficult to accomplish in deep water. Further, as wind direction and wind intensity change, it is often necessary or desirable to re-orient floating vessels to face into the wind or in some other desired direction while maintaining a position generally over the fixed location on the water bottom.

A variety of mooring methods and apparatus have been used and described in the literature. Some methods involve elaborate schemes of positioning anchors and anchor lines. Another method involves the use of air cushioning devices and a circular superdeck. Other methods envision the use of a well which extends vertically through the vessel and through which are passed a plurality of anchor lines.

The following patents illustrate various types of ship mooring methods and apparatus.

| U.S. Pat. No. | Issued | Class | Inventor |
|---|---|---|---|
| 3,191,201 | 6-29-65 | 9/8 | Richardson et al. |
| 3,461,828 | 8-19-69 | 114/.5 | Bielstein |
| 3,525,312 | 8-25-70 | 114/.5 | Beck et al. |
| 3,590,407 | 7-6-71 | 9/8 | Bratiann et al. |
| 3,552,343 | 1-5-71 | 114/.5 | Scott |
| 3,620,181 | 11-16-71 | 114/.5 | Naczkowski |
| 3,583,354 | 6-8-71 | 114/206 | Flickinger |
| 2,919,671 | 1-5-60 | 114/230 | Knapp et al. |
| 3,440,671 | 4-29-69 | 9/8 | Smulders |
| 3,279,404 | 10-18-66 | 114/.5 | Richardson |

Each system has its own advantages and disadvantages. For example, with some prior art systems the method of use is so cumbersome as to be impractical. Other systems are expensive and can be readily incorporated into ships and other vessels only during original construction.

There exists a continuing need for alternative methods and apparatus for mooring vessels generally over a fixed position on the water bottom. In particular, there exists a need for a ship mooring method and related apparatus which can be used with and incorporated into existing vessels without major structural alteration or modifications.

SUMMARY OF THE INVENTION

The present invention involves a method and apparatus for mooring floating vessels (such as well drilling ships) generally above a fixed location on the water bottom. The vessel is provided with guide means which substantially completely encircle the hull of the vessel along a line which is both at or above the Plimsoll line and at or below the top edge of the hull*; in the case of a floating structure which does not have a hull in the conventional sense, the structure includes means which provide the necessary buoyancy, and the guide means are mounted in an encircling manner around the structure above a characteristic load waterline of the structure.* A plurality of attaching means are carried by the guide means for separately attaching a plurality of anchor lines to the hull. Control means are provided for selectively moving and positioning the attaching means along the guide means and for selectively accumulating or discharging anchor lines.

In a typical installation, a track is mounted on or in the hull of a ship along a line near the top edge of the hull. A plurality of carriages are mounted on the track for movement fore or aft as desired. Controls (e.g. electrical, hydraulic, etc.) are provided to cause the carriages to be moved fore or aft or to remain in the fixed position, all as desired. The carriages are further equipped with means for selectively accumulating or discharging anchor line.

BRIEF DESCRIPTION OF THE DRAWINGS

FIG. 3 is an enlarged fragmentary cross sectional view of the present track and carriage arrangement taken along the line 3—3 of FIG. 1.

FIG. 4 is an enlarged fragmentary sectional view of the track and carriage taken along the line 4—4 of FIG. 3.

FIG. 5 is a cross sectional view of the track and carriage arrangement taken along the line 5—5 of FIG. 4.

DETAILED DESCRIPTION OF THE PREFERRED EMBODIMENT

THE VESSELS

Figure 1:
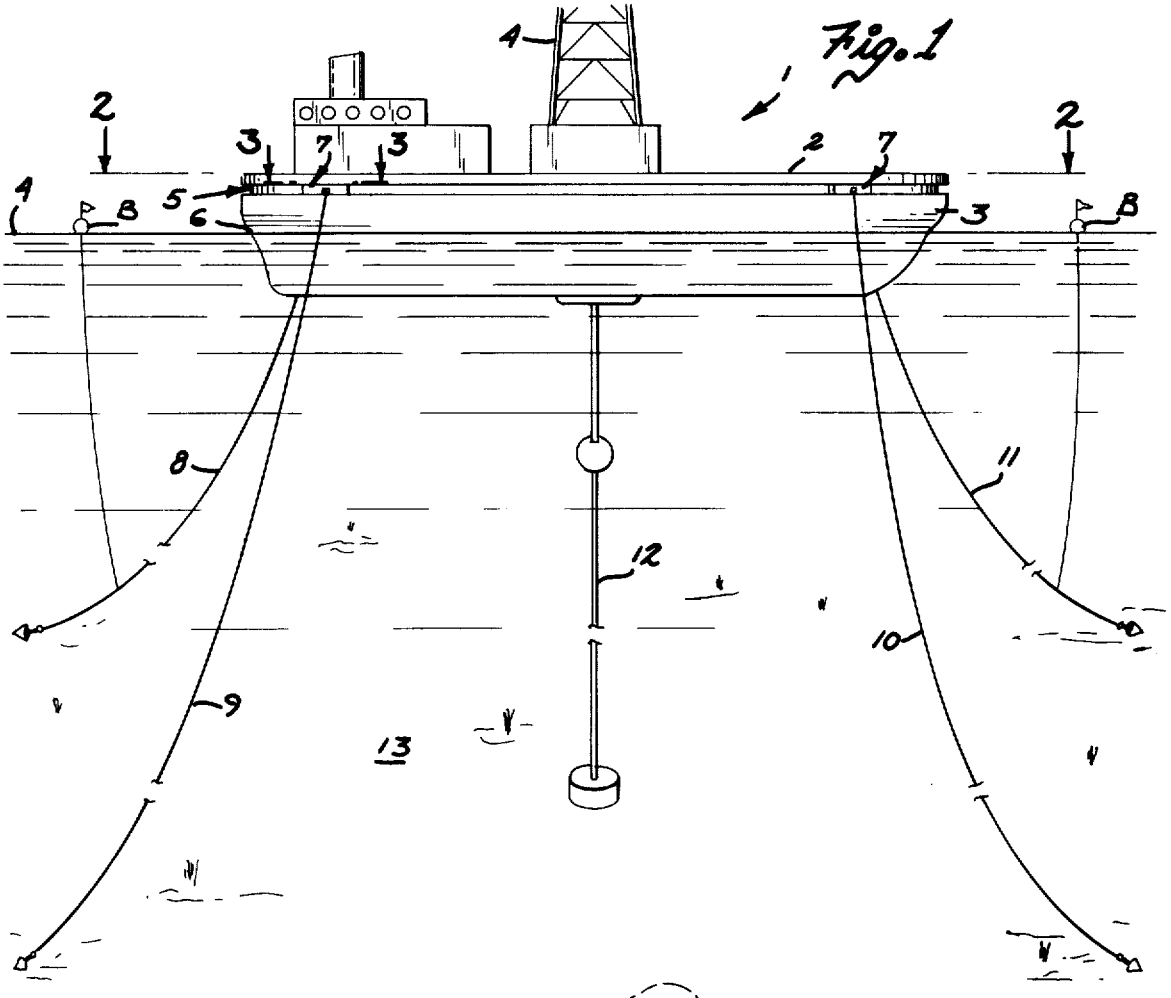
FIG. 1 is a schematic view of a drilling ship positioned over a fixed location on the water bottom.

The present method and apparatus can be used in conjunction with a variety of vessels intended to be floated in a body of water. Thus, the invention is applicable to ships, barges, semi-submersibles and the like. It is particularly well suited for use with ships, especially well drilling ships of the type used for off-shore oil and gas well drilling operations.

GUIDE MEANS

The vessels will be provided with means for supporting and guiding a plurality of anchor line attaching means about the perimeter of the hull to any selected point. The guide means will typically be in the form of some type of track. A particularly convenient type of track is a generally C-shaped channel within which can [guide] *ride* some means (e.g. wheeled carriages) for attaching anchor lines to the vessel. The track will be located along a line which is both at or above the Plimsoll line of the vessel (i.e., at or above the water line) and at or below the top edge of the hull. Depending upon various design and other considerations, the track can be located adjacent the top edge of the hull (e.g. along the perimeter of the main deck or at some point between the top edge of the hull and the Plimsoll line). Locations at or near the top edge of the hull are preferred so as to increase the roll stability of the vessel and to reduce exposure of the mooring apparatus to water. The track may be mounted external of the hull or can be formed within the hull.

For maximum versatility, the guide means (e.g. a channel track) should completely encircle the vessel.

Such an arrangement will permit the means for attaching anchor lines to the hull to be moved along the track to any desired location around the hull. However, design considerations may make it desirable for the track to substantially completely encircle the hull of the vessel without completely encircling it (e.g. separate tracks may be mounted on each side of the hull from bow to stern with no track being provided across the bow or stern). Other arrangements providing substantially complete encircling of the hull will be suggested to those skilled in the art of ship construction and ship mooring.

The following considerations are typically taken into account in determining the type and location of the guide means of the present invention. First, the guide means should be mounted close to the hull of the ship (i.e. adjacent the perimeter of the hull) so they will not materially interfere with docking and other maneuvering of the vessel. Alternatively means could be provided for moving the guide means inwardly during docking and other operations. Secondly, the guide means can be mounted in a horizontal plane which passes through or close to the center of floatation of the vessel or at some point above the center of floatation at which the force exerted by the anchor lines acts to overcome the rolling effect of the waves. In this manner, rolling of the vessel is minimized when the moored vessel is struck by strong waves allowing continuation of the drilling operation.

ANCHOR LINE ATTACHING MEANS

A plurality of anchor line attaching means will be supported by and movable along the guide means. The purpose of the anchor line attaching means is for connecting a plurality of anchor lines to the hull. The attaching means include means for accumulating and discharging anchor line on command. The attaching means may include or be supplemented by means for storing excess anchor lines.

CONTROL MEANS

Control means are provided for selectively positioning the anchor line attaching means at desired points along the guide means. Such controls can be mechanical, electric, hydraulic or the like. A convenient method for transmitting power to the anchor line attaching means is by use of a driven chain or cable which is moved in or along the guide means. If desired, a plurality of chains or cables can be used (e.g. two parallel cables, each moving in a direction opposite that of the other). The anchor line attaching means can then be selectively connected to one of the moving chains or cables (e.g. via a drive gear and clutch arrangement) to thereby alter the position of the attaching means. Similarly, the attaching means can be clamped to the guide means or some other stationary object and the moving chain or cable can be used as a source of power to selectively accumulate or discharge anchor line (e.g. by means of a winch). The movement of the attaching means along the guide means and the controlling of the length of the anchor lines can occur simultaneously if desired (as can the control of the lengths of several of the anchor lines).

DETAILED EMBODIMENT

The present invention is further illustrated by reference to the following detailed description when read in conjunction with the drawings.

In FIG. 1 is shown a drilling ship generally designated by the numeral 1. The ship includes a main deck 2, a hull 3 and a drilling tower 4. The ship includes a channel track 5 which completely encircles the ship along a line which is both above the Plimsoll line 6 and below the top edge of the hull 3. Within the generally C-shaped channel 5 are mounted a plurality of carriages 7.

As shown in FIG. 1, the ship 1 is equipped with four carriages 7 to which are separately attached four anchor lines 8, 9, 10 and 11. A drill pipe 12 extends from the bottom of hull 3 of ship 1 and penetrates the bottom 13 of a body of water 14. An anchor buoy B is preferably attached to one or more of the anchor lines 8–11.

Figure 2:
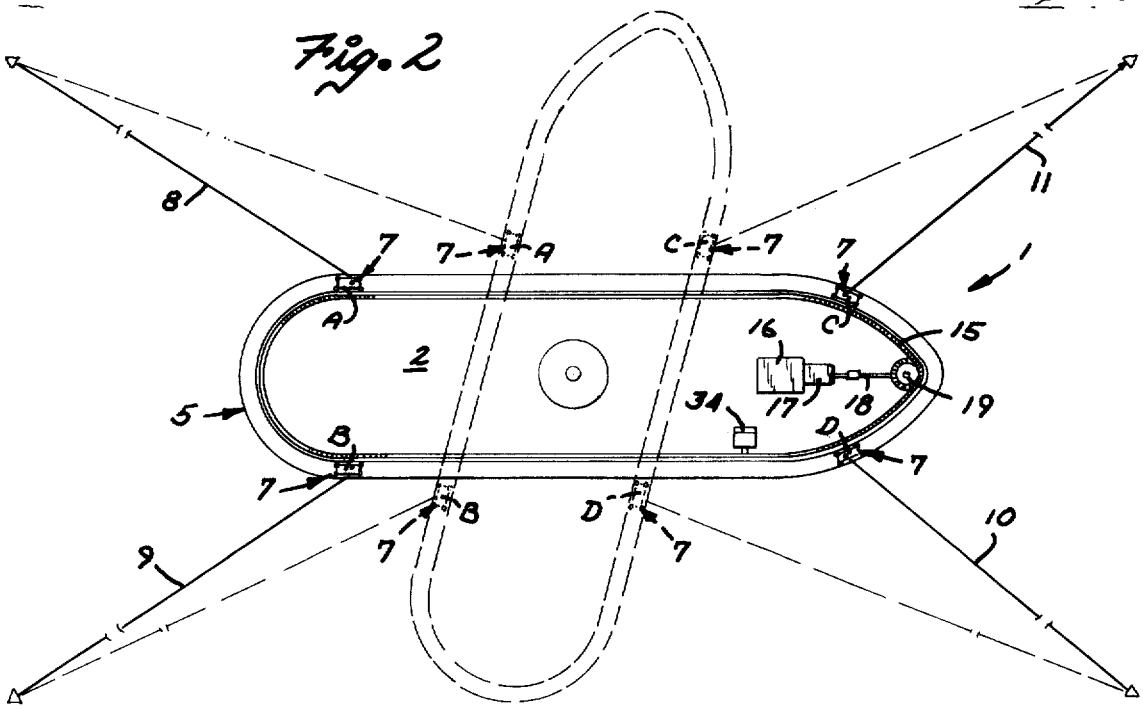
FIG. 2 is a top view of the ship of FIG. 1 taken along the line 2—2 in the direction of the arrows. A second orientation of the ship is shown in dotted lines.

As can be seen particularly well in FIG. 2, the carriages 7 are shifted in channel track 5 to permit vessel 1 to be reoriented with regard to wind or wave direction while maintaining a generally fixed location above a point on the floor of the body of water 14. For purposes of comparison, the four carriages 7 have been labeled A, B, C and D in the two superimposed views (which together form FIG. 2) to permit one to observe how the positions of carriages 7 change in order to accommodate the change in the position of ship 1. Note that anchor line attaching means 7B and 7C both shift to the opposite side of the ship when the ship is reoriented over less than 90°.

As shown in FIG. 2, a chain 15 also encircles the ship immediately adjacent channel track 5 to provide a source of power to the carriages 7. The chain 15 is driven by a motor 16 through a transmission 17, a drive shaft 18 and sprocket 19. Other means for driving chain 15 (e.g. two or more sprockets and drive motors), as well as the use of separate power sources mounted on each carriage 7, can also be utilized.

The details of construction of carriage 7 and related equipment are more clearly shown in FIGS. 3, 4 and 5.

As shown in FIGS. 3–5, the carriage 7 comprises a carriage body 20 which is supported within channel track 5 by rollers 21–28. Carriage 7 includes a winch 29 for accumulating and discharging anchor line 30. Carriage 7 further includes one or more gears 31 for engaging moving chain 15 and clutch means (not shown) provided for the purpose of either using the power transferred to gear 31 via chain 15 to move carriage 7 within channel 5 or to transmit power from the gear 31 to winch 29. Alternatively, clutch means can be provided to selectively move gear 31 into engagement within moving chain 15. Another gear 32 is provided for selectively engaging or disengaging fixed rack 33 which is mounted within channel 5 for locking carriage 7 in a fixed location within channel 5.

Gears 31 and 32 can be moved into or out of their respective operating positions by means of solenoids or other activating devices (not shown). For example, a remote control switch box 34 can be connected to each carriage body 20 by means of a plug in electrical cable. The switch box can be provided with switches for such functions as moving the carriage 7 fore or aft, locking carriage 7 into position, and accumulating or discharging anchor line 30 (e.g. by operating or disengaging winch drum 29).

The details of construction of carriage 7 of FIG. 3 are more fully shown in FIGS. 4 and 5 where like numerals indicate like parts.

Electrical power can be transmitted to carriage 7 by various means such as sliding contacts 35 as shown in FIGS. 4 and 5.

For most purposes, the method of the present invention will employ at least three and preferably four anchor lines, each separately attached to the ship. The ship or other vessel can be oriented or reoriented over a fixed location on the water bottom while or by moving the points of attachment of the anchor lines along the guide path (e.g. along the guide track).

*The arrangement described above and shown in the drawings is my preferred arrangement for this invention in the context of a floating vessel having a single buoyant hull.*

What is claimed is:

1. A vessel intended to be floated in a body of water, said vessel comprising:

a. a hull;

b. guide means carried by said hull and substantially completely encircling said hull along a line [between the top of said hull and] *above* the Plimsoll line;

c. a plurality of attaching means moveably carried by said guide means for separately attaching a plurality of anchor lines to said hull and for controlling the length thereof; and d. control means operably connectable to said attaching means for selectively moving said attaching means to selected points along said guide means to vary the position of the vessel, for holding said attaching means at said selected points and for operating said attaching means to control the length of said anchor lines.

2. A vessel of claim 1 wherein said control means includes a chain-like member which is mounted for movement adjacent said guide means and which is operably connectable to each of said attaching means in response to signals from said control means.

3. A vessel of claim 2 wherein said guide means is mounted just within said hull.

4. A vessel of claim 2 which includes at least four anchor lines.

5. A method [of] *for* mooring a vessel in a body of water generally over a fixed location on the water bottom, said method comprising:

a. attaching a plurality of anchor lines to the hull of said vessel at points which are located adjacent the perimeter of said hull along a line which is [between the top edge of said hull and] *above* the Plimsoll line;

b. selectively moving the points of attachment of said anchor lines along a pre-determined guide path which is fixed adjacent the perimeter of the hull to in turn move the vessel to orient the vessel in a desired direction; and c. holding the anchor lines at selected points along the guide path to hold the vessel oriented in said desired direction.

6. A method of claim 5 in which said anchor lines are each attached to a different carriage movably mounted on a track which extends around the perimeter of said hull for selective movement about said hull and including the step of adjusting the length of said anchor lines.

*7. A structure intended to be floated in a body of water and to be moored while floating, comprising:*

*a. buoyant means arranged to float at a characteristic waterline in use of the structure,*

*b. a substantially horizontal deck supported by the buoyant means above said waterline,*

*c. guide means carried by and substantially encircling the structure along a line above said waterline,*

*d. a plurality of attaching means movably carried by the guide means for separately attaching a plurality of anchor lines to the structure, and*

*e. control means operably connectible to the attaching means for selectively moving the attaching means to selected points along the guide means to vary either the moored position or the moored heading of the structure and for holding the attaching means at the selected points.*

*8. A method of mooring a floating structure in a body of water generally over a fixed location on the water bottom, the method comprising:*

*a. attaching a plurality of anchor lines to the structure at points which are located adjacent the perimeter of the structure above the load waterline of the structure,*

*b. selectively moving the points of attachment of the anchor lines along a predetermined guide path which is fixed adjacent the perimeter of the structure to in turn move the structure to orient the structure in a desired direction, and*

*c. holding the anchor lines at selected points along the guide path to hold the structure oriented in the desired direction.*

* * * * *